United States Patent Office 3,574,077
Patented Apr. 6, 1971

3,574,077
EVAPORATION-ELECTRODIALYSIS PROCESS FOR PRODUCING FRESH WATER FROM BRINE
Yoshio Tsunoda, Tokyo, and Leo Ehara and Hideo Kawate, Onahama, Japan, assignors to Asahi Kasei Kabushiki Kaisha, Osaka, Japan
Filed Aug. 13, 1969, Ser. No. 849,668
Claims priority, application Japan, Aug. 17, 1968, 43/58,240, 43/58,241; Nov. 30, 1968, 43/87,392, 43/87,393
Int. Cl. B01d 13/02
U.S. Cl. 204—180     11 Claims

ABSTRACT OF THE DISCLOSURE

A process for producing fresh water efficiently by passing the brine through a system consisting of an evaporator and an electrodialyzer using ion exchange membranes (hereinafter referred to as an electrodialyzer) and, if required, an ion exchanger while preventing the formation of scale in the evaporator.

BACKGROUND OF THE INVENTION

(1) Field of the invention

Figure 1:
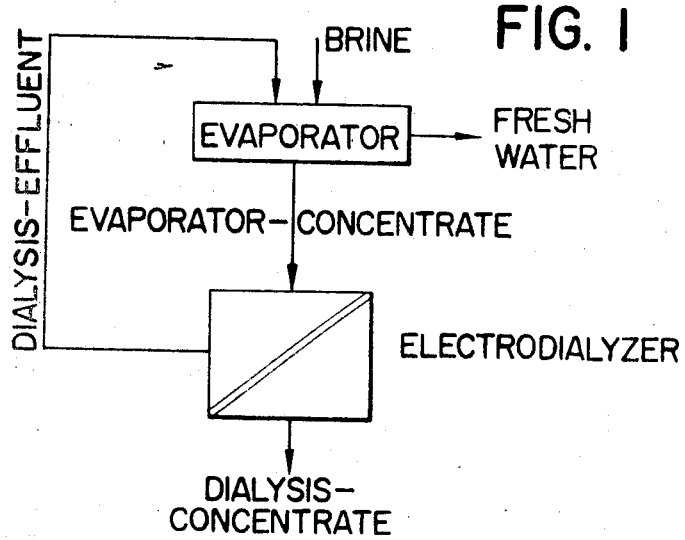

This invention relates to the production of fresh water from brine.

(2) Description of the prior art

Hitherto, a process for producing fresh water from brine has been put into practice on a commercial scale by evaporating the brine by means of a multiple effect evaporator or a multiple flash evaporator. However, in this case, the biggest obstacle lies in the scaling on the heating surface of the evaporator. As a process for preventing the scaling, there have been made many proposals, for example, the regulation of pH by addition of acid; the addition of an inhibitor such as polyphosphate, the addition of crystal nuclei of the scale, or the removal of the scale component from the raw material brine by an ion exchange resin or chemical treatment.

However, these prior processes known heretofore are only unsatisfactorily effective for the prevention of the scaling or impractical from the economical standpoint.

It has also been proposed that in a system consisting of an evaporator and an electrodialyzer, an evaporator-concentrate obtained from the evaporator is further concentrated by the electrodialyzer and the dialysis-concentrate obtained therefrom is used as a raw material for the production of salts. This process, however, merely intends the utilization of the evaporator-concentrate as a raw material for the production of salts, and no improvement with respect to the prevention of the scaling in the evaporator has been achieved.

Furthermore, as the evaporation of water in the brine proceeds, there occurs the elevation of boiling point and increase in energy consumption required for the evaporation. Thus, it is disadvantageous from an economical point of view to concentrate the brine highly in the conventional processes. In addition, the scaling on the heating surface increases in direct proportion to the degree of the concentration. Hence, there exists naturally a limit for the concentration ratio. While the concentration ratio depends upon the compostion of the brine, in general, in a process for producing fresh water from sea water, the ratio of normally 2, when employing a multiple flash evaporator, and the ratio is usually 3 in a multiple effect evaporator. That is, there is a drawback in the conventional processes in that the raw material sea water is required in an amount 1.5 to 2 times as much as an amount of fresh water to be obtained, and thus the more expenses are incurred in handling a larger amount of sea water to obtain fresh water therefrom.

SUMMARY OF THE INVENTION

An object of the present invention is to provide a novel and efficient process for the production of fresh water from brine, free from drawbacks accompanied by the conventional processes.

The basic principle of this invention resides in that in a system consisting of an evaporator and an electrodialyzer, brine is supplied to the evaporator and water contained in the brine is evaporated therefrom to obtain fresh water and an evaporator-concentrate, and the evaporator-concentrate thus obtained is supplied to the electrodialyzer and separated into a dialysis-concentrate and a desalted dialysis-effluent, and said dialysis-effluent is recycled to the evaporator. Thus, fresh water is obtained efficiently while preventing the scaling in the evaporator.

In the present specification, "brine" means solutions containing salt or salts including sea water. In the process of this invention, no restriction is imposed on the evaporator employed with respect to its structure, model, capacity, etc., and conventional multiple effect evaporator or multiple flash evaporator may be conveniently employed.

The electrodialyzer used in this invention is made of ion exchange membranes having a high permselectivity for the scale ions. Since the scale is composed of salts of bivalent or polyvalent metals such as calcium, magnesium and sulfate ions or carbonate ions, inter alia calcium sulfate, ion exchange membranes capable of permeating substantially bivalent or polyvalent cations such as calcium and magnesium ions and bivalent anions such as sulfate and carbonate ions may be employed.

The cation exchange membranes which may be used in the present invention include, for instance, conventional cation exchange membranes of phenol-sulfonate resin, e.g. p- or m-phenol sulfonate-formaldehyde resin, sulfonated styrene resin, carboxylated styrene or phenol resins.

The anion exchange membranes which may be used in the present invention include, for instance, conventional anion exchange membranes such as polymer type membranes which are obtained by copolymerizing styrene and polyolefin monomer, haloalkylating and then aminating the resulting polymer; polymer type membranes which are obtained by treating copolymers of vinyl compounds having an epoxy group and polyolefin monomer in the similar manner; condensation type membranes which are obtained by condensing diamine, phenol and Formalin; and those membranes obtained by subjecting the surface of the said membranes to treatments for increasing the permeability for bivalent anions.

The membranes of the electrodialyzer are capable of permeating $Ca^{++}$, $Mg^{++}$, $SO_4^{--}$, $HCO_3^-$ and the like, and therefore, the ratio of the scale forming ions to total ions in desalted dialysis-effluent obtained therefrom is smaller than that in the raw material brine. Because the dialysis-effluent in which scale forming ions are decreased is recycled to the evaporator, the ion product of the scale forming ions contained in the brine in the evaporator is maintained below the solubility product. As a result, it is possible to obtain fresh water efficiently while preventing the formation of the scale.

According to the present invention, as will be described hereinafter more in detail in the examples, very small portion of the water contained in the raw material brine is carried over to the final concentrate to be removed from the system, and the balance of water is converted to fresh water. Accordingly, only a small amount of the raw material brine needs to be replenished, and as a result, the costs for the production of fresh water can be considerably reduced. Moreover, the scale forming cations such as calcium ions and the scale forming anions such as sulfate ions in the evaporator are reduced to such an extent that no scale is formed, and the formation of the scale in the evaporator is substantially suppressed. The dialysis-concentrate obtained from the electrodialyzer can be used for the production of salts according to chemical or mechanical means.

In the process of the present invention, the order of arrangement of the evaporator and electrodialyzer can be reversed, or an ion exchanger can further be added to a system consisting of an evaporator and an electrodialyzer.

Figure 2:
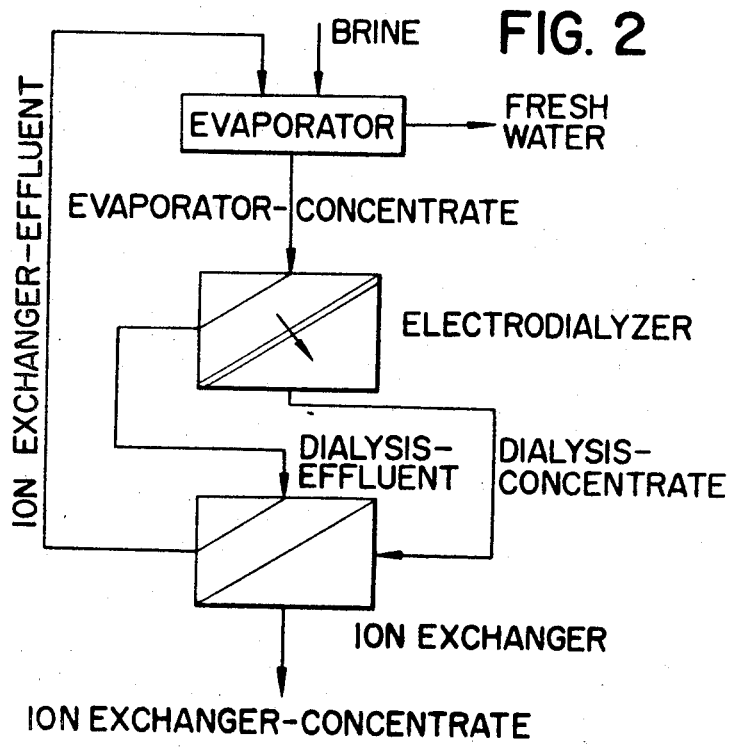
Figure 3:
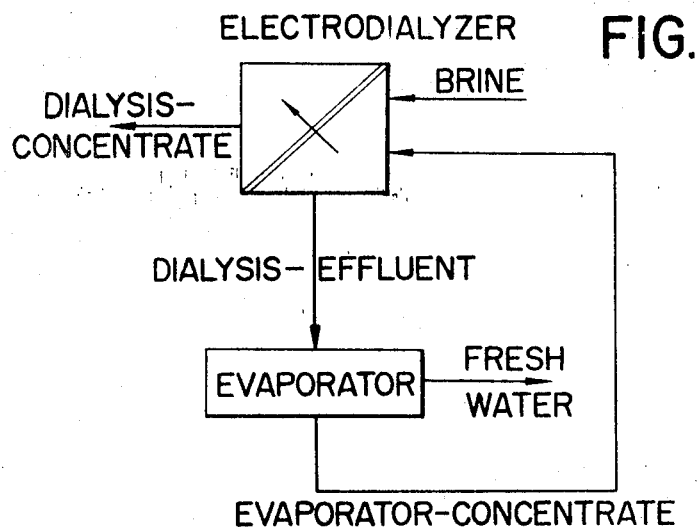
Figure 4:
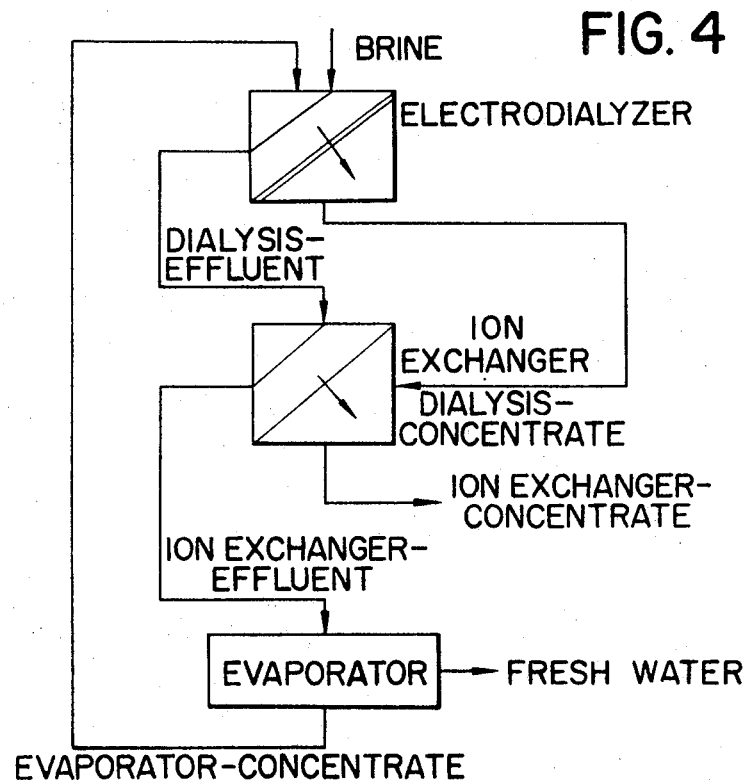

The present invention will be illustrated in conjunction with the drawings, wherein FIGS. 1 and 3 shows a system consisting of an evaporator and an electrodialyzer and FIGS. 2 and 4 show a system consisting of an evaporator, an electrodialyzer and an ion exchanger.

Now referring to FIG. 1, it shows a basic system of the present invention consisting of an evaporator and an electrodialyzer connected thereto.

The raw material brine is supplied to an evaporator and separated into fresh water and an evaporator-concentrate. The evaporator-concentrate is supplied to an electrodialyzer and separated into a desalted dialysis-effluent and a dialysis-concentrate. The dialysis-effluent is recycled to the evaporator and the dialysis-concentrate is removed from the system.

In this process, all salts in the raw material brine are carried over to the dialysis-concentrate in a steady state, and the compositions of the salts contained in the dialysis-concentrate are the same as those of the salts contained in the raw material brine.

If membranes haveing a permselectivity to the scale forming ions such as $Ca^{++}$, $Mg^{++}$, $SO_4^{--}$, $HCO_3^-$ are employed in the electrodialyzer, the ratio of the scale forming ions to total ions in the dialysis-effluent is smaller than that in the raw material brine. Accordingly, the ion product of the scale forming ions in the evaporator are maintained below the solubility products by supplying this desalted dialysis-effluent to the evaporator.

FIG. 3 shows a system consisting of an electro-dialyzer and an evaporator connected thereto. The raw material brine is supplied to the electrodialyzer. In the electrodialyzer, the brine is separated into a dialysis-concentrate and a desalted dialysis-effluent, and the dialysis-effluent is supplied to the evaporator and the dialysis-concentrate is discharged from the system. The raw material brine and dialysis-effluent are separated into fresh water and an evaporator-concentrate by passing them through the evaporator, and the latter is recycled to the electrodialyzer.

In this process, all salts in the raw material brine are carried over to the dialysis-concentrate in a steady state, and the weight and compositions of the salts contained in the dialysis-concentrate are the same as those of the salts contained in the raw material brine. If the membranes having a permselectivity to the scale forming ions such as $CA^{++}$, $Mg^{++}$, $SO_4^{--}$, $HCO_3^-$ are used in the electrodialyzer, the ratio of the scale forming ions to total ions in the dialysis-effluent leaving the electrodialyzer is smaller than that in the raw material brine. As a result, the formation of the scale in the evaporator may be prevented.

FIG. 2 shows a system in which an evaporator, an electrodialyzer and an ion exchanger are connected in series. The raw material brine is supplied to the evaporator and separated into fresh water and an evaporator-concentrate. The evaporator-concentrate obtained from the evaporator is supplied to the electrodialyzer and separated into a dialysis-effluent and a dialysis-concentrate. The dialysis-effluent is further passed through the ion exchanger in which the scale component ions are absorbed on ion exchange resins. A desalted exchanger-effluent thus obtained is recycled to the evaporator. On the other hand, the dialysis-concentrate obtained from the electrodialyzer is used as a regeneration liquid for the ion exchange resins on which the scale forming ions are absorbed and the resulting ion exchanger-concentrate is discharged from the system.

In this process, the total salts in the raw material brine are carried over to the ion exchanger-concentrate in a steady state, and the weight and compositions of the salts contained in the ion exchanger-concentrate are the same as those of the salts contained in the raw material brine.

The ion exchange membranes used in the electrodialyzer in this process are composed of cation exchange membranes and anion exchange membranes either one of which has no permselectivity to the scale component ions, i.e. cations such as $Ca^{++}$, $Mg^{++}$ and anions such as $SO_4^{--}$ and $HCO_3^-$.

For instance, when cation exchange membranes having a permselectivity to cations of the scale components are used in the electrodialyzer, the ratio of the scale forming ions to total ions in the dialysis-effluent is smaller than that in the raw material brine. On the other hand, since anion exchange membranes have no permselectivity to the scale forming anions, the ratios of each anion to total ions in the dialysis-effluent are equal to or larger than those in the evaporator-concentrate. In other words, the ratios of each anion to total ions in the dialysis-effluent are larger than those in the raw material brine. The dialysis-effluent is passed through the ion exchanger and the scale forming anions are absorbed on an anion exchange resin.

The ratio of the scale forming ions to total ions in the ion exchanger-effluent leaving the ion exchanger is smaller than that in the evaporator-concentrate. Accordingly, the formation of the scale in the evaporator may be prevented by recycling the ion exchanger-effluent to the evaporator. In order to reuse the absorbed resin repeatedly, the dialysis-concentrate having a smaller ratio of scale forming ions to total ions than that in dialysis-effluent is employed for the regeneration of the absorbed resins.

The foregoing is an explanation of an embodiment of the present invention in which membranes having a permselectivity to the scale forming cations are employed as cation exchange membranes in the electrodialyzer and the ion exchange resin used in the ion exchanger is an anion exchange resin, and vice versa.

FIG. 4 shows a system consisting of an electrodialyzer, an ion exchanger and an evaporator connected in series.

The raw material brine is supplied to the electrodialyzer and a dialysis-effluent and a dialysis-concentrate are obtained from the electrodialyzer. The dialysis-effluent is supplied to the ion exchanger in which the scale forming ions are absorbed to produce a desalted ion exchanger-effluent. The desalted ion exchanger-effluent is supplied to the evaporator, and fresh water and evaporator-concentrate are obtained therefrom. On the other hand, the dialysis-concentrate from the electrodialyzer is used as a regeneration liquid for the ion exchanger. In this system, the total salts in the raw material brine are carried over to the ion exchanger-concentrate, and the weight and compositions of the salt contained in the ion exchanger-concentrate are the same as those of the salts contained in the raw material brine.

The ion exchange membranes used in the electrodialyzer are composed of cation exchange membranes and anion exchange membranes either one of which has no permselectivity to the scale forming cations or anions. As an exemplary, an explanation will be made in the following with respect to an embodiment wherein cation exchange membranes having a permselectivity to the scale forming cations are employed.

Since cation exchange membranes having a permselectivity to the scale forming cations $Ca^{++}$, $Mg^{++}$ are employed, the ratio of the scale forming cations to total ions in the dialysis-effluent is smaller than that in the raw material brine and the value of the ratio is in inverse proportion to the permselectivity of the membranes. On the other hand, since anion exchange membranes have no permselectivity to the scale forming anions, the ratio of the scale forming anions to total ions in the dialysis-effluent is larger than that in the raw material brine. The dialysis-effluent is passed through the ion exchanger to remove the scale forming anions therefrom. Thus the ratio of the scale forming anions to total ions in the resulting ion exchanger-effluent is smaller than that in the raw material brine. After all, the scale forming cations are removed by the electrodialyzer, furthermore the scale forming anions are removed by the ion exchanger and the resulting desalted ion exchanger-effluent is supplied to the evaporator. As a result, the formation of the scale in the evaporator may be prevented.

The dialysis-concentrate from the electrodialyzer is employed as a regeneration liquid for the ion exchanger. Since this dialysis-concentrate is obtained from the electrodialyzer using ion exchange membranes having no permselectivity to the scale forming anions, the ratio of the scale forming anions to total ions in the dialysis-concentrate is smaller than that in the dialysis-effluent. Therefore, this dialysis-concentrate can be used as a regeneration liquid. The weight and compositions of the salts contained in the ion exchanger-concentrate obtained by the regeneration of the ion exchange resin is entirely equal to those of the salts in the raw material brine.

In the foregoing, explanations are made with respect to an embodiment in which membranes having a cation permselectivity are used as ion exchange membranes and the membranes having no anion permselective absorption are used as an ion exchange resin, and vice versa.

In a system as shown by FIGS. 1 and 2, the quantitative relation is as follows:

The amount of brine to be supplied to the system is the sum of the amount of fresh water obtained from the evaporator and the amount of dialysis-concentrate obtained from the electrodialyzer or that of ion exchanger-concentrate obtained from the ion exchanger.

On the other hand, while the concentration of scale forming ions in the evaporator-concentrate discharged from the evaporator should be maintained below the solubility product of these ions in order to prevent the scaling, this can be accomplished by adjusting the amount of dialysis-effluent or ion exchange-effluent recycled to the evaporator.

Although it is preferably that the ratio of the amount of dialysis-effluent or ion exchange-effluent to that of the material brine be varied depending upon the composition of the material brine, in general, the ratio is from about 0.2 to about 5. When using sea water, the preferable ratio ranges from about 0.5 to about 2. In short, it is possible to determine an optimum amount of the effluent to be recycled depending upon the type and concentrations of salts of the material brine by carrying out a small scale experimental run beforehand.

Similarly, in a system as shown by FIGS. 3 and 4, it is necessary for preventing the formation of the scale in the evaporator that the ion product of the scale forming ions be maintained below the solubility product of the scale and this depends upon the amount and composition of dialysis-effluent or ion exchanger-effluent. Thus, in order to maintain the ion product mentioned above at a suitable value, it is necessary that, primarily, the electrodialyzer has a liquid-handling capacity and a desalting capacity sufficient to give the required value of the ion product. It is also necessary that the ion exchanger provided depending upon needs has a sufficient capacity.

While the capacities of these equipments should be adequately determined depending upon the composition of the material brine, they can be determined by conducting a small scale experimental run beforehand.

DESCRIPTION OF THE PREFERRED EMBODIMENTS

An explanation of the present invention will be made by the following examples:

Example 1

The procedure of this example is carried out in the system illustrated in FIG. 1.

An evaporator-concentrate obtained from a flash type evaporator having a capacity of producing 0.853 ton per hour of fresh water was passed through an electrodialyzer in which a plurality of cation exchange resin membranes and anion exchange resin membranes are arranged alternately to be separated into 0.147 ton per hour of a dialysis-concentrate and 0.853 ton per hour of a dialysis-effluent, and the dialysis-effluent was recycled to the evaporator together with 1.0 ton per hour of sea water. In the steady state, the evaporator-concentrate contained 1.0 eq./kg. of chloride ion, 0.090 eq./kg. of sulfate ion, and 0.027 eq./kg. of calcium ion respectively. No scaling on the heating pipe was observed after 240 hours of continuous operation.

The cation exchange resin membranes employed in this example were those obtained by the following procedures:

Cation exchange resin membrane used in Example 1 is prepared by the following method.

A mixture of 3500 parts by weight of ethylene chloride and 1056 parts by weight of dioxane is reacted with 980 parts by weight of anhydrous sulfuric acid while keeping the reaction temperature at a temperature lower than 5° C. to give a white precipitate in dioxane. Into an ethylene chloride solution containing said white precipitate and dioxane there is immersed at room temperatures for 12 hours sheets of a styrene-divinylbenzene polymer matrix obtained by the procedure described in Example 1 of British Pat. No. 797,191 or German Pat. No. 1,078,769. After this sulfonation procedures, the sheets are washed with ethylene chloride, then with a 0.5 normal sodium chloride aqueous solution. Cation exchange resin membrane thus obtained has the properties including a transport number of sodium ion in a 1.5 normal sodium chloride aqueous solution at 15° C. of 77%, and a relative conductivity in a 0.5 normal sodium chloride aqueous solution at 25° C. of $35 \times 10^{-3} \Omega^{-1}$ cm.$^{-2}$. The anion exchange membranes were those prepared by coating a partial condensate of toluidine diisocyanate and polyethylene glycol in a thickness of less than 0.001 mm. on the surface of the side of diluting chamber of the membrane prepared by the method described below, and hardening the coated material under wet condition, and which had a sulfate ion selectivity coefficient of 1.2 on the basis of the total ion concentration.

Anion exchange resin membrane employed in Example 1 is prepared by the following method.

60 parts by weight of newly distilled styrene is subjected to partial polymerization in currents of nitrogen at 100° C. for 2 hours. The resultant polymer mixture (containing about 4% by weight of the polymer) is admixed with 20 parts by weight of 2-vinylpyridine, 8 parts by weight of ethylvinyl benzene, 12 parts by weight of divinylbenzene, 15 parts by weight of dioctylphthalate and 0.5 part by weight of lauroyl peroxide, then subjected to polymerization stepwise, i.e., at 60° C. for 48 hours and at 80° C. for 48 hours, in currents of nitrogen. The resultant polymer is planed by means of a planar to form membranes of 0.1 mm. thickness, which are followed by treating with ethanol to remove the plasticizer contained therein. The membranes are then heated in 100 parts of a mixture of ethylene bromide and methanol in a weight ratio of 1:1 to give anion exchange resin membranes which has a relative conductivity of $18.2 \times 10^{-3} \Omega^{-1}$ cm.$^1$ in a 0.5 normal sodium chloride aqueous solution.

Comparative Example 1

Example 1 was repeated except that the sea water was vaporized until chloride ion in the evaporator-concentrate was 1.0 eq./kg. and the evaporator-concentrate was removed from the system without treating in the electrodialyzer. The resulting fresh water was approximately 0.5 ton per hour, and a remarkable scaling (mainly consisting of gypsum) in the evaporator was observed after 240 hours of continuous operation.

Example 2

The procedure of this example is carried out in the system illustrated in FIG. 2.

132.4 kg. per hour of an evaporator-concentrate obtained from a long-tube type evaporator capable of evaporating 88.5 kg. per hour of water under the normal pressure was supplied to an electrodiolyzer which was composed of the same cation exchange resin membranes as in Example 1 and anion exchange resin membranes obtained by the following method.

Anion exchange resin membranes used in Examples 3 and 5 are those prepared by the following method.

Styrene-divinylbenzene polymer matrix obtained by the procedures described in Example 1 of British Pat. No. 797,191 or German Pat. No. 1,078,769 is planed to form membranes of 0.7 mm. thickness. 30 parts by weight of the membranes are treated with ethanol to remove the plasticizer contained therein, dried, heated at 50° C. for 1 hour together with chloromethylether, allowed to cool to room temperature, and admixed with 14 g. of zinc chloride as a catalyst. The admixture is kept at 25° C. for 7 hours, then at room temperature for 49 hours. The membranes thus chloromethylated are washed with water, dried in air, and heated together with a mixture of dimethylpropanolamine and water at refluxing temperature for 5 hours. The anion exchange resin membranes thus aminated have properties including a transport number of chlorine ion in a 1.5 normal sodium chloride aqueous solution of 85%, and a relative conductivity in a 0.5 normal sodium chloride aqueous solution of $25 \times 10^{-3} \Omega^{-1}$ cm.$^1$. 16.6 kg. per hour of dialysis-concentrate and 115.8 kg. per hour of dialysis-effluent were obtained from the electrodialyzer. The dialysis-effluent was passed through an absorption tower of the continuous ion exchanger described in U.S. Pat. No. 3,152,072; British Pat. No. 987,021; French Pat. No. 1,291,343; and Italian Pat. No. 651,496 which contained a strong baisc anion exchange resin "Diaion SA–10A," a product of Mitsubishi Kasei K.K. The dialysis-concentrate was supplied to a regeneration tower of the ion exchanger. A desalted ion exchanger-effluent from the absorption tower was recycled to the evaporator after mixing with 105.2 kg. per hour of sea water.

The compositions of the liquids obtained from various stages in the steady state are shown in the following Table 1. No scaling on the heating pipe was observed after a continuous operation of 240 hours.

TABLE 1

|  | Ion (eq./kg.) | | |
| --- | --- | --- | --- |
|  | Chloride | Sulfate | Calcium |
| Evaporator-concentrate | 0.937 | 0.056 | 0.027 |
| Dialysis-effluent | 0.562 | 0.055 | 0.012 |
| Dialysis-concentrate | 3.574 | 0.062 | 0.127 |
| Ion exchanger-effluent | 0.605 | 0.016 | 0.012 |
| Ion exchanger-concentrate | 3.290 | 0.325 | 0.126 |

Example 3

The procedure of this example is carried out in the system illustrated in FIG. 3.

0.703 ton per hour of an evaporator-concentrate obtained from a flash type evaporator capable of producing 0.880 ton per hour of fresh water was mixed with 1.025 ton per hour of sea water. The mixture was passed through an electrodialyzer wherein a plurality of cation exchange resin membranes and anion exchange membranes which are the same as in Example 1 are alternately arranged. 1.583 ton per hour of dialysis-effluent and 0.145 ton per hour of dialysis-concentrate were separated. The dialysis-effluent was recycled to the evaporator. In the steady state, the composition of the evaporator-concentrate was:

|  | Eq./kg. |
| --- | --- |
| Chloride ion | 0.69 |
| Sulfate ion | 0.062 |
| Calcium ion | 0.024 |

No scaling on the heating pipe was observed after 240 hours of continuous operations.

Comparative Example 2

Example 2 was repeated except that the sea water was evaporated until chloride ion in the evaporator-concentrate was 0.69 eq./kg. and the evaporator-concentrate was removed from the system without passing through the electrodialyzer. The resulting fresh water was approximately 0.4 ton per ton of the sea water. Remarkable scaling in the evaporator was observed after 240 hours of continuous operation.

Example 4

The procedure of this example is carried out in the system illustrated in FIG. 4.

1.5 ton per hour of an evaporator-concentrate obtained from a flash type evaporator capable of evaporating approximately 1 ton per hour of water under normal pressure was supplied to an electrodialyzer using the same anion and cation exchange membranes as used in Example 1. Approximately 0.19 ton per hour of dialysis-concentrate and approximately 1.31 ton per hour of dialysis-effluent were obtained from the electrodialyzer. The dialysis-effluent was passed through an absorption tower of the continuous ion exchanger identical with the one used in Example 3 of said patent, and the dialysis-concentrate was passed through a regeneration tower, respectively. A desalted ion exchanger-effluent obtained from the absorption tower was recycled to the evaporator after being mixed with approximately 1.19 ton per hour of sea water.

The compositions of liquids obtained from various stages in the steady state are shown in the following Table 2. No scaling on the heating pipe was observed after a continuous operation of 300 hours.

TABLE 2

|  | Ion (eq./kg.) | | |
| --- | --- | --- | --- |
|  | Chloride | Sulfate | Calcium |
| Evaporator-concentrate | 0.942 | 0.056 | 0.027 |
| Dialysis-effluent | 0.565 | 0.054 | 0.013 |
| Dialysis-concentrate | 3.592 | 0.063 | 0.125 |
| Ion exchanger-effluent | 0.605 | 0.016 | 0.012 |
| Ion exchanger-concentrate | 3.300 | 0.324 | 0.124 |

Example 5

The procedure of this example is carried out in the system illustrated in FIG. 4.

0.370 ton per hour of evaporator-concentrate obtained from a flash type evaporator capable of evaporating 0.884 ton per hour of water under normal pressure and 1.025 ton per hour of sea water were supplied to an electrodialyzer using the same cation exchange resin membranes as used in Example 1 and the same anion exchange resin membranes as used in Example 2. 0.141 ton per hour of dialysis-concentrate and 1.254 ton per hour of dialysis-effluent were obtained from the electrodialyzer. The dialysis-effluent was passed through an absorption tower of the continuous ion exchanger described in U.S. Pat. No. 3,152,072; British Pat. No. 987,021; French Pat. No. 1,291,343; and Italian Pat. No. 651,496 using a strong basic anion exchange resin "Diaion SA–10A," a product of Mitsubishi Kasei K.K. The dialysis-concentrate was supplied to a regeneration tower. The resulting desalted ion exchanger-effluent was recycled to the evaporator.

The compositions of each liquid obtained from various stages under steady state are tabulated in the following Table 3. No scaling on the heating pipe was observed after 240 hours of continuous operation.

TABLE 3

| | Ion (eq./kg.) | | |
|---|---|---|---|
| | Chloride | Sulfate | Calcium |
| Sea water | 0.525 | 0.054 | 0.020 |
| Evaporator-concentrate | 1.110 | 0.058 | 0.029 |
| Dialysis-effluent | 0.295 | 0.049 | 0.009 |
| Ion exchanger-effluent | 0.328 | 0.017 | 0.009 |
| Ion exchanger-concentrate | 3.820 | 0.390 | 0.146 |

What is claimed is:

1. A process for producing fresh water and concentrated brine in a system consisting of an evaporator and an electrodialyzer using ion exchange resin membranes which comprises supplying a raw material brine to the evaporator to separate said brine into fresh water and an evaporator-concentrate, supplying said evaporator-concentrate to the electrodialyzer to separate said evaporator-concentrate in to a dialysis-concentrate and a dialysis-effluent, said dialysis-effluent being recycled to said evaporator in admixture with the said material brine, and the amount of said dialysis-effluent recycled being sufficient to maintain the ion product of scale forming cations and anions below the solubility products thereof in the evaporator.

2. Process according to claim 1 wherein water content contained in the raw material brine supplied to the evaporator is equal to the sum of an amount of water contained in the dialysis-concentrate and that of fresh water which are discharged from the system.

3. A process according to claim 1 wherein the cation exchange membranes in the electrodialyzer are those which substantially permeate scale forming cations, and a quotient obtained by dividing a ratio of scale forming ions to monovalent ions in dialysis-concentrate by a ratio of scale forming ions to monovalent ions in the raw material brine is not less than 1.0.

4. A process according to claim 1 wherein said evaporator is selected from a long tube type evaporator and a multistage flash evaporator which are capable of vaporizing water contained in the raw material brine to separate the brine into fresh water and evaporator concentrate.

5. A process according to claim 1 wherein an ion exchanger is further connected to said electrodialyzer, and said dialysis-effluent is supplied to an absorption tower of ion exchanger to absorb scale forming anions and the resulting ion exchanger-effluent is recycled to the evaporator together with the raw material brine, and said dialysis-concentrate is supplied to a regeneration tower of the ion exchanger to regenerate the used ion exchange resin and the resulting ion exchanger-concentrate is discharged from the system.

6. A process according to claim 5 wherein said ion exchanger is selected from a fixed bed type and a moving bed type in which a strong anion exchange resin is packed, and the used ion exchange resin is contacted countercurrently with a regeneration liquid.

7. A process for producing fresh water and concentrated brine in a system consisting of an electrodialyzer using ion exchange resin membranes and an evaporator which comprises supplying a raw material brine to the electrodialyzer to separate said brine into a dialysis-concentrate and a dialysis-effluent, supplying said dialysis-effluent to the evaporator to separate said dialysis-effluent into an evaporator concentrate and fresh water, said evaporator-concentrate being recycled to said electrodialyzer in admixture with the said material brine.

8. A process according to claim 7 wherein water contained in the raw material brine supplied to the electrodialyzer is equal to the sum of an amount of water contained in the dialysis-concentrate and that of fresh water which are discharged from the system.

9. A process according to claim 7 wherein said evaporator is selected from a long tube type evaporator and a multistage flash evaporator which are capable of evaporating water contained in the raw material brine to separate the brine into fresh water and evaporator concentrate.

10. A process according to claim 7 wherein an ion exchanger is further connected to said electrodialyzer which is connected to the evaporator, and said dialysis-effluent is supplied to an absorption tower of ion exchanger to absorb scale forming anions and the resulting ion exchanger-effluent is supplied to the evaporator to separate the ion exchanger-effluent into fresh water and an evaporator-concentrate, and said dialysis-concentrate is supplied to a regeneration tower of the ion exchanger to regenerate the used ion exchange resin and the resulting ion exchanger-concentrate is discharged from the system, said evaporator-concentrate being recycled to the electrodialyzer.

11. A process according to claim 10 wherein said ion exchanger is selected from a fixed bed type and a moving bed type in which a strong anion exchange resin is packed, and the used ion exchange resin is contacted countercurrently with a regeneration liquid.

References Cited

UNITED STATES PATENTS

| 2,776,258 | 1/1957 | Gilliland | 210—26 |
| 2,802,344 | 8/1957 | Witherell | 204—180X |
| 3,056,651 | 10/1962 | McIlhenny et al. | 204—180 |
| 3,496,081 | 2/1970 | Scheder | 204—301X |

OTHER REFERENCES

U.S. Dept. of the Interior, Saline Water Conversion (Symposium), 1957, pp. 308, 309.

NORMAN YUDKOFF, Primary Examiner

D. EDWARDS, Assistant Examiner

U.S. Cl. X.R.

203—7, 11, 39; 210—26